Aug. 16, 1938.    G. FORNI    2,126,700
METER BOX
Filed Feb. 6, 1937
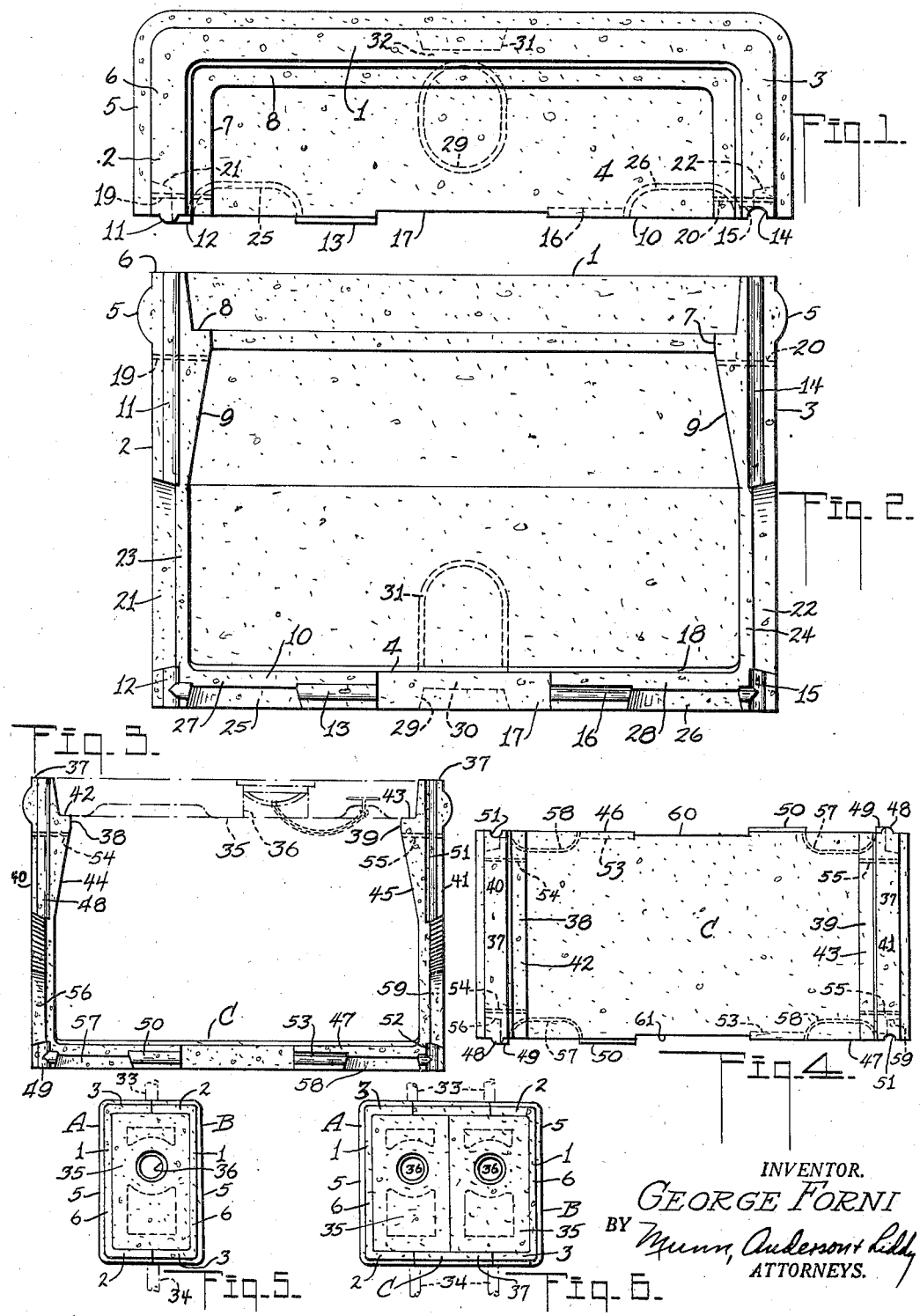
INVENTOR.
GEORGE FORNI
BY Munn, Anderson & Liddy
ATTORNEYS.

Patented Aug. 16, 1938

2,126,700

UNITED STATES PATENT OFFICE 2,126,700

METER BOX

George Forni, Oakland, Calif.

Application February 6, 1937, Serial No. 124,455

6 Claims. (Cl. 137—13)

My invention relates to improvements in a meter box, and it consists of the combinations, constructions and arrangements hereinafter described and claimed.

It has been the usual practice to provide a separate box for each meter. In apartment houses, this necessitates a great number of boxes, because a separate meter is provided for each apartment and a box must be provided for each meter.

The principal object of my invention is to provide a sectional meter box in which any desired number of sections may be added to provide a box of the desired length, this box being long enough to house any desired number of meters. I provide two end sections which when placed together form a box large enough to receive a single meter. I further provide U sections that may be disposed intermediate the end sections when it is desired to elongate the box to a point to house additional meters. When two meters are housed in a single box, one U section is placed between the end sections. Additional U sections are then disposed in place for each additional meter that is to be housed within the box.

The end and U sections are made of a predetermined size so that a single cover will act as a closure for the box when formed from two abutting end sections, and two covers will act as a closure for a box formed from two end sections and a U section. These covers are provided with openings through which the meter dial may be read and when more than one cover is used for closing an elongated box, these openings in the covers will be disposed directly above the various dials on the meters. In this simple way a covered meter box may be constructed to house any desired number of meters.

It has also been the practice to provide the meter boxes without bottoms. This permits the box to fill up with dirt and other debris and furthermore the walls of the box will gradually sink into the earth to a point where the top of the box will be disposed below the ground level.

Another object of my invention is to provide a meter box that is not only made up from sections but which also is provided with a bottom that will keep the interior of the box dry and free from dirt. The upper surfaces of the box section bottoms are inclined and are provided with recesses at their lower points that will form openings in the completed box for permitting any water to drain therefrom.

The abutting edges of the sections carry complemental ribs and grooves that fit into each other to cause the sections to form a continuous wall when the sections are joined together. This wall will prevent dirt and the like from gaining access to the box between the sections. The box sections are further provided with recesses on their lines of joining with other box sections and the thin walls of any desired recess may be knocked out thus providing an opening for receiving a water or gas pipe. Each end section, for example, is provided with a half recess adjacent to the edge that abuts the complemental edge of an adjacent U section or end section. The half recesses are not only provided in the side walls of the end sections, but are also provided in the bottom. In addition the connecting wall of the end section is provided with a recess and the bottom is provided with another recess disposed adjacent to the one just mentioned. The result is that the box may be formed from the desired number of sections and then the wall portions disposed adjacent to certain recesses can be knocked out for accommodating pipes. The sections may be secured together by and desired means such as by wire that is passed through openings in the sections.

A further object of my invention is to provide a device of the type described which is extremely simple in construction and which is durable and efficient for the purpose intended.

Other objects and advantages will appear in the following specification, and the novel features of the device will be particularly pointed out in the appended claims.

My invention is illustrated in the accompanying drawing forming a part of this application, in which Figure 1 is a plan view of an end section;

Figure 2 is a front elevation of Figure 1;

Figure 3 is a side view of a U section shown on a reduced scale;

Figure 4 is a top plan view of Figure 3;

Figure 5 shows a box on a further reduced scale formed from two end sections; and Figure 6 shows a box formed from a number of sections closed by two covers placed side by side.

In carrying out my invention I provide an end section (see Figures 1 and 2). The end section has an end wall 1, side wall portions 2 and 3, and a bottom 4. The section is preferably made from concrete and may be reinforced in any desired manner. The side wall portions 2 and 3 have a bead 5 formed integral with the box and being placed near the upper edge 6 of the box. The bead 5 extends along the end wall 1 of the end section as clearly shown in Figure 1. The end section is further provided with an inwardly extending flange 7 and this flange forms a seat 8 for a cover hereinafter described. The inner wall surface 9 disposed beneath the flange 7, tapers toward the bottom of the end section in the manner shown in Figure 2 and this provides sufficient support for the flange to carry the box cover.

It will be noted from Figures 1 and 2 that the edge 10 of the end section is provided with rib portions 11, 12, and 13, and groove portions 14, 15, and 16. At the center and bottom of the edge 10 I provide a recess 17. In actual practice another end section identical to the one shown in Figures 1 and 2 will be provided, and when these two sections are placed together the ribs 11, 12 and 13 of both sections will fit into the complemental grooves 14, 15 and 16. The recesses 17, will form a drain opening for the bottom of the box. Figure 2 illustrates how the upper surface 18 is inclined toward the recess 17 for causing water to drain toward this recess.

The end section is further provided with openings 19 and 20 adjacent to the edge 10 and just beneath the innermost portion of the flange 7. When the end sections are placed in abutting relation they may be held together by passing wire (not shown) through the openings 19 and 20 in the adjacent sections. In this way the two parts of the box are secured together.

It will be seen thus far that I have provided a box formed from two abutting end sections. I have provided the end sections with recesses that form thin walls which may be knocked out when it is desired to provide the box with openings for receiving pipes leading to and from a meter (not shown). Four of these recesses are disposed along the edge 10. Figure 2 shows the side wall portions 2 and 3 provided with recesses 21 and 22. These recesses extend to the edge 10 and form one half of an opening when the thin walls 23 and 24 associated with the recesses are knocked out. If for example, the wall 23 is knocked out then the thin wall is also knocked out of the adjacent recess in the abutting end section. The two openings thus provided form one single opening large enough to receive a pipe. The bottom 4 of the box is provided with recesses 25 and 26 that extend to the edge 10. These recesses leave thin wall portions 27 and 28 that may be knocked out. It is possible to provide openings in the bottom of the end section by knocking out these thin walled portions 27 and 28.

Figure 1 further shows a recess 29 formed in the under surface of the bottom 4 and this provides a thin wall portion 30 that may be knocked out for providing an opening in the bottom. The end wall 1 has a recess 31 disposed adjacent to the recess 29 and Figure 1 shows this recess 31 providing a thin wall portion 32 that also may be knocked out for providing an opening. It will be seen from this construction that openings for pipes may be provided in the side or the end walls of the completed box or in the bottom.

In Figure 5 I show a box formed from two abutting end sections indicated at A and B. The recesses 21 and 22 in both of these end sections have had their thin wall portions 23 and 24 knocked out for providing openings through which the inlet and outlet pipes 33 and 34 may extend. A cover 35 closes the top of the box and has an opening 36 therein through which the meter dial (not shown) may be read. The cover 35 may be reinforced if desired. The end sections A and B are secured together by passing wires (not shown) through adjacent openings 19 and 20 in both sections.

If it is desired to provide a meter box of twice the size as that shown in Figure 5 I separate the end sections A and B from each other by a U section indicated generally at C. The U section is shown in detail in Figures 3 and 4 and it will be noted that this section closely resembles the end sections, the only difference being the elimination of the end wall 1. The U section C has two upper edges 37 designed to lie flush with the upper edges 6 of the end sections A and B. The U section further has inwardly extending flanges 38 and 39 on each side wall 40 and 41 respectively. The flanges 38 and 39 form seats 42 and 43 for the covers 35. The wall portions 44 and 45 disposed below the flanges 38 and 39 are inclined at a slight angle in order to properly reinforce the flanges.

The edges 46 and 47 (see Figure 4) of the member C are formed with ribs and grooves in the same manner as the edge 10 of the end portion. For example, the edge 47 has ribs 48, 49 and 50 and grooves 51, 52 and 53. The edge 46 is provided with similar ribs and grooves and like reference numerals are applied to similar parts. The side walls 40 and 41 are further provided with openings 54—54 and 55—55 as shown in Figure 4 for receiving wire that connects the U section with adjacent sections.

The member C also has recesses in its bottom and side walls corresponding to the recesses 21, 22, 25, and 26 in the end portion. These recesses are numbered from 56 to 59 inclusive. Since the recesses disposed adjacent to each edge 46 and 47 are identical, corresponding reference numerals are used for similar parts. It will also be seen from Figure 4 that the edges 46 and 47 have centrally disposed recesses 60 and 61 that extend entirely through the bottom wall. These recesses cooperate with recesses 17 in the end sections or with complemental recesses in adjacent members C.

In Figure 6 I show a box constructed from two end members A and B and a central member C. The members are all secured together by wires (not shown) that are passed through the openings 19, 20, 54 and 55. The box shown in Figure 6 is large enough to receive two covers 35. Two gas inlet pipes 33 are shown leading into the larger box and two gas outlet pipes 34 are shown leading from the box. The meters (not shown) will be connected to the pipes 33 and 34 and the meter dials will be disposed directly beneath the openings 36 in the covers 35. In order to provide openings for the pipes 33 and 34 in the box shown in Figure 6, the thin walls adjacent to the recesses 21, 22, 56, and 59 are knocked out.

From the foregoing description of the various parts of the device, the operation thereof may be readily understood.

I have already described the exact construction of the end sections and the U section and have further set forth how the end sections may be secured together to provide a box of a given capacity and how a box of twice the capacity can be provided by merely disposing a U section between the two end sections. In like manner the length of the box can be extended at will, to accommodate any desired number of meters.

Where the two end sections are separated by one or two U sections, a special cover (not shown)

can be provided in place of the two or three covers of the size shown. The pipes 33 and 34 enter the sides or bottoms of the completed boxes where ¾" meters are used. If larger meters are used such as a 1" meter, the pipes leading to and from the meter will extend through openings in the end walls of the end section. It will be seen from this that the boxes are extremely adaptable for various uses.

The box can act as a gauge for keeping the meter at the proper height. The top of the box lies flush with the ground surface and the knock out openings determine the level of the pipes which in turn correctly position the meter in the box.

When it is desired to enlarge a box after the box has been placed in the ground, it is merely necessary to dig a space in the ground to permit an end section to be moved to accommodate a U section. The end section will break away from the adjoining section at the place where a pipe enters the box, and this obviates the necessity of removing the pipe from the box when enlarging the box to house an additional meter.

While I have shown only the preferred form of my invention, it should be understood that various changes or modifications may be made within the scope of the appended claims without departing from the spirit of the invention.

I claim:

1. A meter box formed from two end sections and a U section disposed therebetween, each end section having a bottom portion with a recess disposed at the line of joining with the U section, the U section having a bottom with a recess at each line of joining, whereby the box is provided with a bottom with two drain openings therein.

2. A sectional meter box composed of two identical ends, each end having three walls and a bottom, the edge of joining being provided with ribs and grooves designed to fit into complemental ribs and grooves in the other end.

3. An expansible sectional box composed of two identical ends designed to abut each other to form a complete box, a cover for the box, and a U-shaped member adapted to be placed between the ends to enlarge the box to twice its capacity, said cover being so designed that two of them placed side by side will close the enlarged box.

4. An expandible meter box comprising end sections with bottom portions and sides of equal lengths, U-sections placed between the end sections, the bottoms of the U-sections cooperating with the bottoms of the end sections for providing a continuous bottom for the entire box.

5. An expandible meter box comprising two end sections designed to abut each other to form a complete box that will hold one meter, the abutting edges of the end sections having half recesses that combine to form pipe openings for the meter, a U-shaped member adapted to be placed between the ends for enlarging the box to twice its former capacity for holding two meters, the abutting edges of the U-shaped member having half recesses that cooperate with the recesses in the end sections for forming pipe openings for both meters.

6. An expandible meter box comprising two end sections designed to abutt each other to form a complete box that will hold one meter, the abutting edges of the end sections having half recesses that combine to form pipe openings for the meter, a U-shaped member adapted to be placed between the ends for enlarging the box to twice its former capacity for holding two meters, the abutting edges of the U-shaped member having half recesses that cooperate with the recesses in the end sections for forming pipe openings for both meters, and a cover large enough to close the box when formed only of two end sections, said cover having an opening in alignment with the meter dial, said covers being so designed that two of them placed side by side will close the enlarged box, the openings in the two covers being aligned with the dials of the two meters.

GEORGE FORNI.